(12) United States Patent
Tanaka (10) Patent No.: US 7,836,994 B2
(45) Date of Patent: Nov. 23, 2010

(54) SEAT BELT RETRACTOR AND SEAT BELT APPARATUS

(75) Inventor: Koji Tanaka, Tokyo (JP)

(73) Assignee: Takata Corporation, Tokyo (JP)

( * ) Notice: Subject to any disclaimer, the term of this patent is extended or adjusted under 35 U.S.C. 154(b) by 712 days.

(21) Appl. No.: 11/444,434

(22) Filed: Jun. 1, 2006

(65) Prior Publication Data

US 2006/0289219 A1 Dec. 28, 2006

(30) Foreign Application Priority Data

Jun. 28, 2005 (JP) ............................. 2005-188473

(51) Int. Cl.
B60K 28/12 (2006.01)
B60R 22/34 (2006.01)
(52) U.S. Cl. ..................... 180/268; 180/286; 280/807
(58) Field of Classification Search ................ 180/268, 180/286; 280/807; 297/474, 475, 481; 701/45
See application file for complete search history.

(56) References Cited

U.S. PATENT DOCUMENTS

| | | | | |
|---|---|---|---|---|
| 4,461,493 | A * | 7/1984 | Doty | 280/807 |
| 5,261,696 | A * | 11/1993 | Hamaue | 280/802 |
| 5,292,153 | A * | 3/1994 | Mishina | 280/807 |
| 5,520,263 | A * | 5/1996 | Suran et al. | 180/270 |
| 5,558,370 | A * | 9/1996 | Behr | 280/806 |
| 6,257,363 | B1 * | 7/2001 | Midorikawa et al. | 180/268 |
| 6,360,981 | B1 | 3/2002 | Specht | |
| 6,374,938 | B2 | 4/2002 | Yano et al. | |
| 6,485,057 | B1 * | 11/2002 | Midorikawa et al. | 280/807 |
| 6,848,644 | B2 | 2/2005 | Eberle et al. | |
| 7,308,348 | B2 * | 12/2007 | Tanaka et al. | 701/45 |
| 7,631,720 | B2 * | 12/2009 | Takao et al. | 180/268 |
| 7,681,683 | B2 * | 3/2010 | Takao et al. | 180/268 |
| 7,712,567 | B2 * | 5/2010 | Tanaka et al. | 180/268 |
| 2003/0217882 | A1 * | 11/2003 | Sakakida et al. | 180/268 |
| 2005/0154517 | A1 | 7/2005 | Tanaka et al. | |
| 2006/0065771 | A1 | 3/2006 | Takao et al. | |

FOREIGN PATENT DOCUMENTS

| | | |
|---|---|---|
| DE | 197 31 689 A1 | 2/1999 |
| DE | 102 04 477 A1 | 8/2003 |
| EP | 1 074 439 A2 | 2/2001 |
| JP | 2000052926 | 2/2000 |
| JP | 2001-253317 | 9/2001 |
| JP | 2002-173000 | 6/2002 |
| JP | 2005-280497 | 10/2005 |
| WO | WO 99/51469 A | 10/1999 |

* cited by examiner

Primary Examiner—Toan C To
Assistant Examiner—Laura Freedman
(74) Attorney, Agent, or Firm—Foley & Lardner LLP (57) ABSTRACT

The disclosed seat belt retractor and seat belt apparatus may comprise: an electric motor; a spool that is capable of winding and unwinding a seat belt for occupant restraint in association with the driving of the electric motor; and a controller for controlling the electric motor. A starting condition can be defined by the state of the seat belt relative to a vehicle occupant and the state of a vehicle door corresponding to the seat belt and, in cases where a starting condition is satisfied, the controller can be configured to control the electric motor to rotate in the belt winding direction such that the motor output of the electric motor is varied according to a satisfaction pattern of the starting condition.

14 Claims, 5 Drawing Sheets

SEAT BELT RETRACTOR AND SEAT BELT APPARATUS

BACKGROUND

The present invention relates to a technology for developing a seat belt retractor to be installed in a vehicle.

Conventionally, a seat belt apparatus is known, which is structured to protect an occupant in a vehicle by a seat belt (or webbing) restraining the occupant. For example, Japanese PCT International Application No. 2003-507252 (the '252 publication) discloses a structure of a seat belt retractor of a seat belt apparatus in which a spool (or winding shaft) can be rotated for the winding and unwinding of a seat belt by an electric motor.

The technology described in the '252 publication proposes a possibility of using an electric motor to conduct the seat belt winding action of the spool in the structure of the seat belt retractor. When this structure is used for the control of the winding up of the seat belt (the seat belt storing control) in order to prevent the seat belt from being kept in the unwound state, it is desired to reasonably control the seat belt winding action by the electric motor.

Specifically, the original purpose of the seat belt storing control is to prevent a seat belt, which is kept in the unwound state, or a tongue attached to the seat belt from being caught by a vehicle door. A sophisticated (detailed) control can be enabled if the action of the vehicle door catching the seat belt or the tongue is reflected in the control of the seat belt winding action. The inventor of the present disclosure focused attention on the behavior of the vehicle door during the seat belt winding control and came up with a structure capable of changing the mode of the seat belt winding action based on the behavior of the vehicle door.

SUMMARY

It is an object of an embodiment of an embodiment of the present invention to provide a seat belt retractor to be installed in a vehicle in which the seat belt winding action uses an electric motor to prevent a seat belt from being kept in the unwound state and the seat belt retractor is effective for rationalizing the seat belt winding action.

The present application discloses a seat belt retractor, which can achieve the above mentioned object. The present seat belt retractor can be typically adopted to be installed in an automobile. In addition, the present disclosure can be adopted to a technology for developing a seat belt retractor to be installed in a vehicle other than the automobile, such as an aircraft, a boat, a train, and a bus.

The present application discloses several exemplary embodiments of a seat belt retractor to be installed in a vehicle. According to the first embodiment, the seat belt retractor may comprise an electric motor, a spool, and a controller. The spool can be capable of winding and unwinding a seat belt for an occupant restraint in association with the driving of the electric motor. The controller may control the electric motor to rotate in the belt winding direction such that the motor output of the electric motor is varied according to a satisfaction pattern of the starting condition in cases where the starting condition, which is defined by the state of the seat belt relative to a vehicle occupant and the state of a vehicle door corresponding to the seat belt, is satisfied.

The spool can be a member, which is operated in association with the driving of the electric motor to wind or unwind a seat belt for occupant restraint. The seat belt capable of being wound onto and unwound from the spool is a long belt (sometimes called "webbing") to be worn by a vehicle occupant seated in a seat. Typically, the vehicle occupant seated in the vehicle seat is restrained by the seat belt when restraint is required, such as during a vehicle collision. According to another embodiment of the retractor, if required, a power transmission mechanism may be suitably disposed between the electric motor and the spool to selectively achieve a connected state where the electric motor and the spool are connected and a disconnected state where the connected state is cancelled. In another embodiment, the seat belt winding action by the spool may be conducted only by the driving force of the electric motor or by the winding force of an elastic member, such as a return spring which acts on the spool, with the driving force of the electric motor as a secondary force.

The controller can be adapted at least as a means for controlling the driving of the electric motor in which it can control the driving direction, the driving time, and the output of the electric motor. The controller may typically comprise a CPU (central processing unit), an input/output unit, a storage unit, a peripheral unit, and the like. The controller may be provided exclusively for the seat belt retractor or it can also be used as the control means for other systems, such as for controlling the driving system and/or the electric system.

In cases where the starting condition, which is defined by the state of the seat belt relative to a vehicle occupant and the state of a vehicle door corresponding to the seat belt, is satisfied, the controller can control the electric motor to rotate in the belt winding direction such that the motor output of the electric motor is varied according to a satisfaction pattern of the starting condition. That is, the start of the winding of the seat belt depends on the combination of the state of the seat belt (the worn state or the released state) and the state of the vehicle door (the open state or the closed state). The motor output of the electric motor is varied according to the satisfaction pattern of the starting condition. The satisfaction patterns of the starting condition may be suitably set according to the combination of the state of the seat belt and the state of the vehicle door and the satisfying order. The number of the satisfaction patterns can be set according to need. Because the motor output of the electric motor is the product of a current value (sometimes referred to as a "control current value") and a voltage value (sometimes referred to as an "applied voltage value"), the motor output can be changed by suitably changing the current value and/or the voltage value.

According to another embodiment with regard to the seat belt storing control by the seat belt retractor, the electric motor is used to conduct the seat belt winding action so as to reflect the state of the seat belt and the behavior of the vehicle door in the control of the seat belt winding action as well as to prevent the seat belt from being kept in the unwound state. Therefore, a seat belt retractor capable of providing a sophisticated (detailed) control with regard to the seat belt winding action using the electric motor may be provided.

A second embodiment can be a seat belt retractor in which the controller may control the electric motor to rotate in the belt winding direction such that the motor output of the electric motor is varied according to the state of the vehicle door corresponding to the seat belt in cases where the wearing of the seat belt on the vehicle occupant is cancelled.

It should be noted that, if a seat belt is kept withdrawn from a spool in a seat belt retractor of this kind, there is a risk that trouble will occur in which the seat belt itself or a tongue attached to the seat belt is caught by the vehicle door. In order to prevent such trouble, the seat belt retractor can have a structure so as to conduct the seat belt winding action (the seat belt storing action) for actively winding the withdrawn seat belt onto the spool using an electric motor. In addition, by reflecting the action of the vehicle door catching the seat belt in the control of the seat belt during a winding action, a sophisticated (detailed) control is enabled.

In cases where the wearing of the seat belt on the vehicle occupant is cancelled, the electric motor is controlled to rotate in the belt winding direction such that the motor output of the electric motor is varied based on the state of the vehicle door corresponding to the seat belt (a satisfaction pattern of the starting condition). The timing for the driving of the electric motor to rotate in the belt winding direction may be at a time when the wearing of the seat belt is cancelled or at a time when it is detected that the wearing of the seat belt is already cancelled.

Another embodiment is based on the premise that the original purpose of the seat belt winding action (the seat belt storing control) is to prevent the seat belt, which is kept in the unwound state, or the tongue attached to the seat belt from being caught by the vehicle door so that the reflection of the vehicle door catching the seat belt or the tongue is effective for a sophisticated control. In this case, the speed and time until the seat belt winding action by the electric motor is completed can be set based on the amount of time until the vehicle door is closed.

When there is a long time until the vehicle door is closed, the control in which the motor output of the electric motor is set to a relatively small output or the electric motor is not driven can be conducted in order to gently wind up the seat belt for the vehicle occupant. On the other hand, when there is a short time until the vehicle door is closed, the control in which the motor output of the electric motor is set to a relatively large output is needed in order to rapidly wind up the seat belt. The electric motor is controlled to rotate in the belt winding direction, thereby preventing the seat belt from being kept in the unwound state.

Accordingly, this embodiment relates to the seat belt storing control by the seat belt retractor and enables a sophisticated control with regard to the seat belt winding action.

The third exemplary embodiment, is directed to a seat belt retractor in which the controller may control the electric motor to rotate in the belt winding direction with a first motor output in cases where the vehicle door corresponding to the seat belt is in the closed state when the wearing of the seat belt is cancelled. While in cases where the vehicle door corresponding to the seat belt is in the open state when the wearing of the seat belt is cancelled, the controller may control the electric motor to rotate in the belt winding direction with a second motor output larger than the first motor output.

In the third embodiment of the seat belt retractor, the controller can control the electric motor to rotate in the belt winding direction with a first motor output in cases where the vehicle door corresponding to the seat belt is in the closed state when the wearing of the seat belt is cancelled. On the other hand, the controller can control the electric motor to rotate in the belt winding direction with a second motor output larger than the first motor output in cases where the vehicle door corresponding to the seat belt is in the open state when the wearing of the seat belt is cancelled. In cases where the vehicle door is in a closed state when the wearing of the seat belt is cancelled, there must be a relatively long time until the vehicle door is closed again once it is opened. Thus, in this case, the control in which the motor output of the motor is set to a relatively small output or the electric motor is not driven can be conducted in order to gently wind up the seat belt for the vehicle occupant. On the other hand, in case of the vehicle door already in the open state when the wearing of the seat belt is cancelled, there must be a short time until the vehicle door is closed. Thus, in this case, the control in which the motor output of the electric motor is set to a relatively large output is needed in order to rapidly wind up the seat belt.

Accordingly, the third embodiment can relate to the seat belt storing control by the seat belt retractor and has a structure capable of varying the motor output according to the state of the vehicle door when the wearing of the seat belt is cancelled, thereby enabling a sophisticated control with regard to the seat belt winding action.

The first motor output and the second motor output can be set such that the second motor output is larger than the first motor output. The first motor output may be set to a predetermined value lower than that of the second motor output (including such a motor output in which the spool is not rotated) or zero (the motor does not create an output).

The fourth embodiment can include a controller in which it controls the electric motor to rotate in the belt winding direction in cases where the wearing of the seat belt is cancelled when the vehicle door corresponding to the seat belt is changed from the closed state to the open state. Conversely, the controller may control the electric motor so as to not rotate in cases where the seat belt is worn when the vehicle door corresponding to the seat belt is changed from the closed state to the open state. That is, in cases where the wearing of the seat belt is cancelled immediately after the vehicle door is opened, it is more likely that the vehicle door will not be closed for a while. Thus, in this case, the control in which the motor output of the motor is set to a relatively low output can be conducted in order to gently wind up the seat belt for the vehicle occupant. On the other hand, in cases where the seat belt is in the worn state, the seat belt winding action is not required.

Accordingly, the fourth embodiment can relate to the seat belt storing control by the seat belt retractor. It also has a structure capable of varying the motor output according to the state of the seat belt when the vehicle door is changed from the closed state to the open state, thereby enabling a sophisticated control with regard to the seat belt winding action.

The fifth embodiment is directed to a seat belt apparatus to be installed in a vehicle and may comprise at least a seat belt for occupant restraint, an electric motor, a spool, a controller, a seat belt buckle, a tongue, and a detection sensor. The seat belt can be worn by a vehicle occupant. The spool is capable of winding and unwinding the seat belt in association with the driving of the electric motor. The controller controls the electric motor. The seat belt buckle can be fixed to the vehicle and a tongue is attached to the seat belt and is latched to the seat belt buckle when the seat belt is worn. The detection sensor detects that the tongue is latched to the seat belt buckle. The controller determines whether or not the seat belt is worn by a vehicle occupant based on information detected by the detection sensor in cases where the starting condition (which is defined by the state of the seat belt relative to the vehicle occupant and the state of a vehicle door corresponding to the seat belt) is satisfied. The controller can control the electric motor to rotate in the belt winding direction such that the motor output of the electric motor is varied according to the satisfaction pattern of the starting condition.

The seat belt can be a long belt to be worn by a vehicle occupant seated in a seat and is sometimes called a "webbing". Typically, the vehicle occupant seated in the vehicle seat is restrained by the seat belt when restraint is required, such as during a vehicle collision. The seat belt buckle can be a member fixed to a vehicle body. The tongue may be a member, which is attached to the seat belt and is latched to the buckle when the seat belt is worn by the vehicle occupant. The detection sensor can be a means for detecting that the tongue is latched to the buckle.

The controller may determine whether or not the seat belt is worn by a vehicle occupant based on information detected by the detection sensor. In cases where the starting condition (which is defined by the state of the seat belt relative to the vehicle occupant and the state of a vehicle door corresponding to the seat belt) is satisfied, the controller can control the electric motor to rotate in the belt winding direction such that the motor output of the electric motor is varied according to the satisfaction pattern of the starting condition.

The electric motor and the spool of the fifth embodiment may have substantially the same functions as those of the seat belt retractor according to the first embodiment.

Accordingly, the fifth embodiment can relate to the seat belt storing control by the seat belt apparatus and can prevent the seat belt from being kept in the unwound state by using the electric motor for the belt winding action. The fifth embodiment can also reflect the state of the seat belt and the behavior of the vehicle door in the control of the seat belt winding action. Accordingly, the fifth embodiment can provide a seat belt retractor capable of conducting a sophisticated (detailed) control with regard to the seat belt winding action by using the electric motor.

The sixth embodiment may be directed to a seat belt apparatus in which, in cases where the wearing of the seat belt is cancelled, the controller can control the electric motor to rotate in the belt winding direction such that the motor output of the electric motor is varied according to the state of the vehicle door corresponding to the seat belt.

Accordingly, the sixth embodiment can have substantially the same works and effects as those in the second embodiment described above. This embodiment can relate to the seat belt storing control by the seat belt apparatus and can enable a sophisticated control with regard to the seat belt winding action.

The seventh embodiment is directed to a seat belt apparatus in which the controller can control the electric motor to rotate in the belt winding direction with a first motor output in cases where the vehicle door corresponding to the seat belt is in the closed state when it is determined that the wearing of the seat belt is cancelled based on the information detected by the detection sensor. On the other hand, the controller can control the electric motor to rotate in the belt winding direction with a second motor output larger than the first motor output in cases where the vehicle door corresponding to the seat belt is in the open state when it is determined that the wearing of the seat belt is cancelled based on the information detected by the detection sensor.

The seventh embodiment can have substantially the same works and effects as those of the third embodiment of the present invention. The seventh embodiment can relate to the seat belt storing control by the seat belt apparatus and can enable a sophisticated control with regard to the seat belt winding action.

The eighth embodiment is a seat belt apparatus in which the controller can control the electric motor to rotate in the belt winding direction in cases where it is determined that the wearing of the seat belt is cancelled based on the information detected by the detection sensor when the vehicle door corresponding to the seat belt is changed from the closed state to the open state. On the other hand, the controller can control the electric motor not to rotate in cases where it is determined that the seat belt is worn based on the information detected by the detection sensor.

Accordingly, the eighth embodiment may have substantially the same works and effects as those of the fourth embodiment described above. This eighth embodiment can relate to the seat belt storing control by the seat belt apparatus and may enable a sophisticated control with regard to the seat belt winding action.

The ninth embodiment is a vehicle with a seat belt apparatus in which the seat belt apparatus can comprise the seat belt apparatus of any of the embodiments of the present application. In the vehicle of the ninth embodiment, the seat belt apparatus can be accommodated in an accommodating space in the vehicle, such as an accommodating space in a pillar, an accommodating space in a seat, or an accommodating space in another part of the vehicle.

Accordingly, the ninth embodiment may provide a vehicle comprising a seat belt apparatus which uses an electric motor for the seat belt winding action so as not only to prevent the seat belt from being kept in the unwound state but also to reflect the behavior of a vehicle door into the control of the seat belt winding action. Additionally, the seat belt apparatus can be accommodated in an accommodating space in the vehicle.

As described in the above, the present disclosure relates to a structure of a seat belt retractor in which a spool operates in association with the driving of an electric motor to wind and unwind a seat belt for occupant restraint. The seat belt retractor provides such control as to enable rationalization of the seat belt winding action. That is, in cases where a starting condition (which is defined by the state of the seat belt relative to the vehicle occupant and the state of a vehicle door corresponding to the seat belt) is satisfied, an electric motor can be controlled to rotate in the belt winding direction such that the motor output of the electric motor is varied according to a satisfaction pattern of the starting condition, thereby enabling the rationalization of the seat belt action.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Hereinafter, embodiments of the present invention will be described in detail with reference to the drawings. First, description will be made in regard to the embodiments of the present invention with reference to FIG. 1 and FIG. 2.

Figure 1:
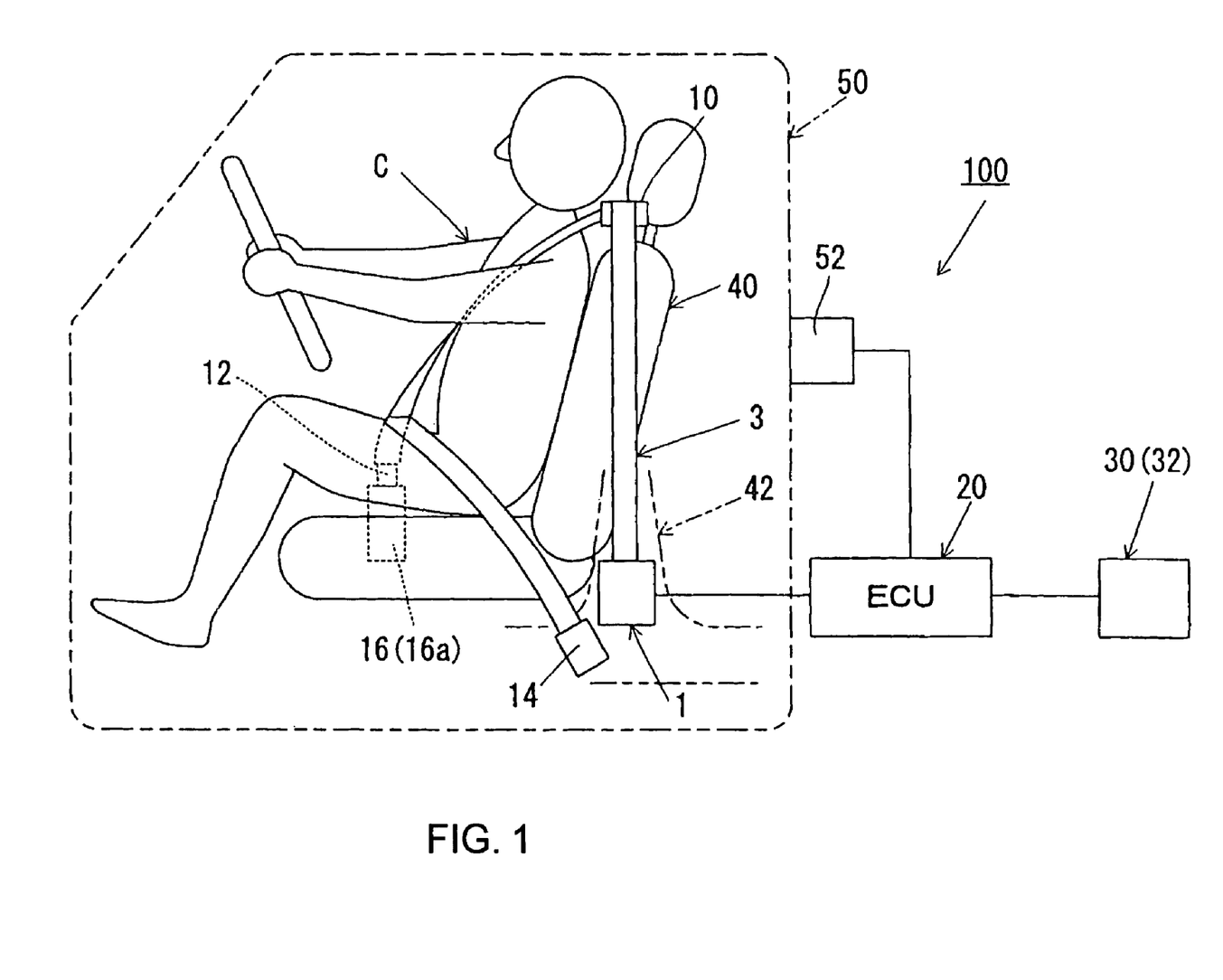
FIG. 1 shows a schematic structure of a seat belt apparatus according to an embodiment of the present invention.
Figure 2:
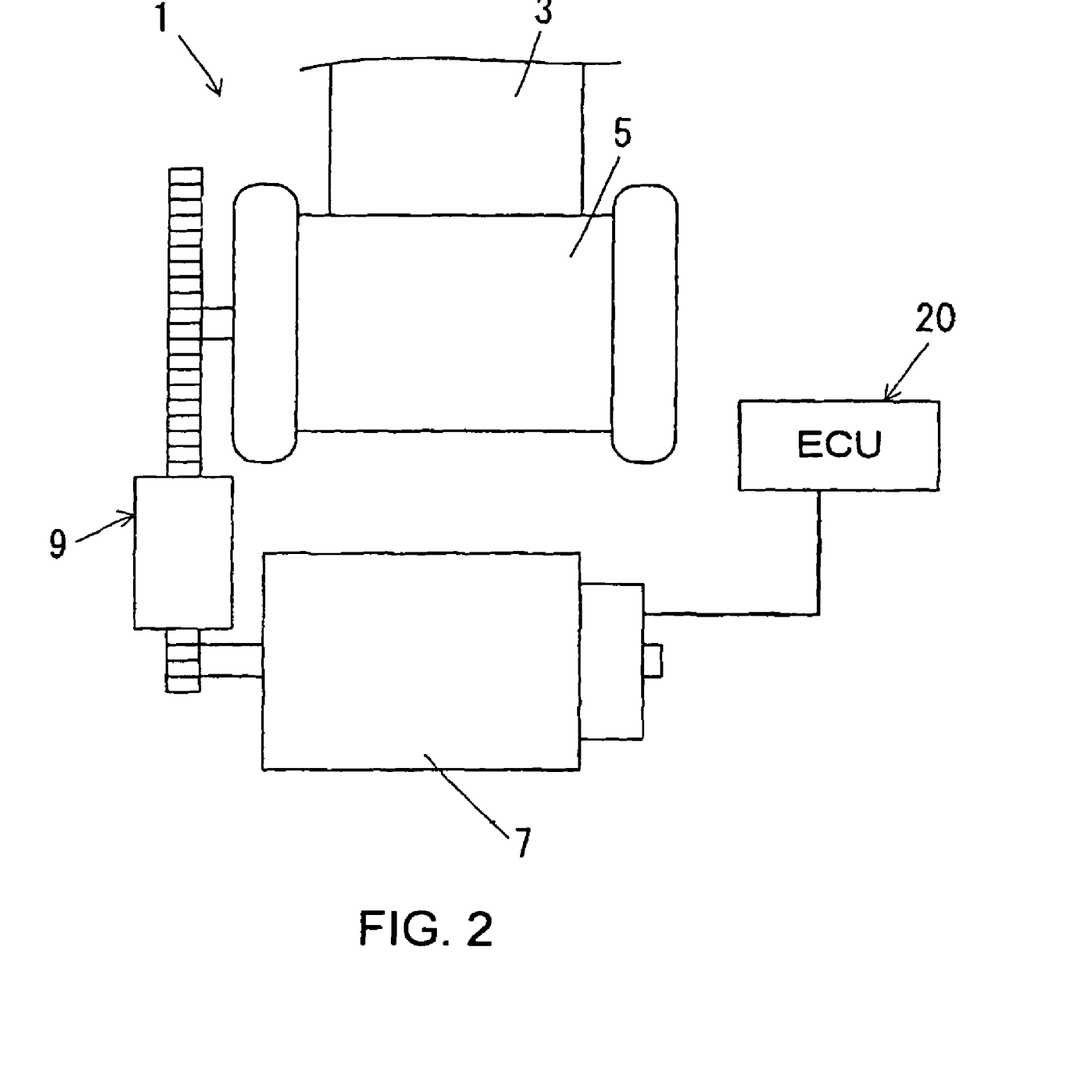
FIG. 2 shows a schematic structure of a seat belt retractor according to an embodiment of the present invention.

FIG. 1 show a schematic structure of a seat belt apparatus 100. FIG. 2 shows a schematic structure of a seat belt retractor 1, such as the one shown in FIG. 1.

As shown in FIG. 1, the seat belt apparatus 100 of this embodiment is a seat belt apparatus for a vehicle to be installed in an automotive vehicle. The seat belt apparatus 100 mainly can comprise a seat belt retractor 1, a seat belt 3, a deflection fitting 10, a tongue 12, an outer anchor 14, a seat belt buckle 16, and an ECU 20. In addition, an input element 30 is installed in the vehicle to detect one or more pieces of information and to input such detected information into the ECU 20. Such information can include information about the collision prediction or the collision occurrence of the vehicle, information about the driving state of the vehicle, information about the sitting position and the body size of a vehicle occupant seated in a vehicle seat, information about the traffic conditions around the vehicle, information about the weather conditions, information about the time zones, and the like. The detected information of the input element 30 can be transmitted to the ECU 20 anytime or at predetermined intervals and is used for the operational control of the seat belt apparatus 100 and the like.

The input element 30 can include a vehicle collision information detection sensor 32 for detecting information about a vehicle collision, such as a prediction of a vehicle collision or an occurrence of an actual vehicle collision. The vehicle collision information detection sensor 32 is a sensor capable of detecting (or measuring) the distance, the speed, and the acceleration of a colliding object (such as a vehicle, obstacle, pedestrian, or the like) relative to the subject vehicle and also capable of detecting (or measuring) accelerations in the three-axial (X-axis, Y-axis, and Z-axis) directions acting on the subject vehicle. The vehicle collision information detection sensor 32 may be composed of a single detection sensor or a combination of a plurality of detection sensors. For example, a millimeter wave radar sensor, a laser sensor, a radar detector, an acceleration sensor, and a camera sensor may be used in the vehicle collision information detection sensor 32.

A vehicle door sensor 52 can be mounted on the vehicle to detect the opening or closing state of a vehicle door 50. For example, a contact sensor may be employed as the vehicle door sensor 52, which may comprise a first contact on the vehicle door side and a second contact on a vehicle pillar side and can detect the opening or closing of the vehicle door according to the contact between the first contact and the second contact. The vehicle door sensor 52 may be considered as a component of the seat belt retractor 1 or the seat belt apparatus 100. The information detected by the vehicle door sensor 52 is transmitted to the ECU 20 and can be used for the "retractor control processes A-C," as will be described later with regard to FIGS. 3-5.

The seat belt 3 is a long belt (or webbing) to be used for restraining a vehicle occupant C (for example, the "driver") seated in a vehicle seat 40, which can be a driver's seat. The seat belt 3 can correspond to the "seat belt for occupant restraint" of the present disclosure. The seat belt 3 is withdrawn from the seat belt retractor 1 fixed relative to the vehicle and extends through a deflection fitting 10 provided around an area about the shoulder of the vehicle occupant C and is connected to an outer anchor 14 through a tongue 12. The deflection fitting 10 has a function of holding the seat belt 3 to the area about the shoulder of the occupant C and guiding the seat belt 3. By inserting the tongue 12 into a seat belt buckle 16 fixed to the vehicle body, the seat belt 3 goes into the state of being worn by the vehicle occupant C. The tongue 12 may correspond to the "tongue" of the present disclosure while the seat belt buckle 16 to which the tongue 12 can be latched may correspond to the "seat belt buckle" of the present disclosure.

The seat belt buckle 16 has a built-in buckle switch 16a. The buckle switch 16a detects that the tongue 12 is inserted into the seat belt buckle 16 so as to connect the seat belt to the seat belt buckle, and thus actually detects that the seat belt is in the worn state. The information detected by the buckle switch 16a is transmitted to the ECU 20, which determines whether or not the seat belt 3 is in the worn state. The buckle switch 16a can correspond to the "detection sensor for detecting that the tongue is latched to the seat belt buckle" of the present disclosure.

The seat belt retractor 1 can be a device capable of performing the action of winding or unwinding the seat belt 3 via a spool 5 and a motor 7 which will be described later. The seat belt retractor 1 can correspond to the "seat belt retractor" of the present disclosure. The retractor 1 can be installed in an accommodating space in, for example, a B-pillar 42 of the vehicle as in the embodiment shown in FIG. 1.

The ECU 20 has a function of conducting the control of the seat belt retractor 1 and other operational mechanisms based on the input signals from the input element 30. The ECU 20 may comprise a CPU (Central processing unit), an input/output unit, a storage unit, a peripheral unit, and the like. Particularly in this embodiment, the ECU 20 can control the motor 7, which will be described later, of the seat belt retractor 1. Specifically, the ECU 20 can control the amount of current supplied to an electromagnetic coil of the motor 7 and the direction of the current supply so as to vary the rotational speed, the rotational direction, the rotational period of time, and the rotational torque (output) of a shaft of the motor 7. The ECU 20 may be structured as a means for controlling the driving of the motor 7 and for controlling a power transmission mechanism 9 to switch between the state where the power of the motor 7 is transmitted to the spool 5 and the state where the power is not transmitted to the spool 5. The details will be described later. Further, the ECU 20 can also be provided with a function of detecting (or measuring) the current value of the motor 7 in operation. The ECU 20 can correspond to the "controller" of the present invention.

The ECU 20 may be exclusive to the seat belt retractor 1 or can also be used to control other systems, such as for controlling a driving system and/or an electric system.

The spool 5 as shown in FIG. 2 is formed in a columnar or cylindrical shape of which the outer periphery (or the seat belt contact face) functions as the wind-up surface on which the seat belt 3 is wound. The spool 5 is a member for performing the winding and unwinding action of the seat belt 3 for occupant restraint in association with the driving of the motor 7. The motor 7 can be the "electric motor" while the spool 5 can correspond to the "spool" of the present disclosure.

In this embodiment, the power transmission mechanism 9 may be arranged between the spool 5 and the motor 7. The power transmission mechanism 9 can be a mechanism capable of creating a connected state where the spool 5 and the motor 7 are connected (the power transmission operation mode) and a disconnected state where the connected state is cancelled (the power transmission disconnection mode). The power transmission mechanism 9, which is sometimes referred to as a so-called "clutch," may comprise a combination of gears. The connected state of the power transmission mechanism 9 is a state where the power of the motor 7 is allowed to be transmitted to the spool via the power transmission mechanism 9. When the motor 7 is driven in this connected state, the power of the motor 7 is transmitted to the spool 5 via the power transmission mechanism 9. At this time, the rotational speed of the motor 7 is reduced by the power transmission mechanism 9. Conversely, in the disconnected state of the power transmission mechanism 9, the physical connection between the spool 5 and the motor 7 is cancelled so as to allow the easy unwinding (or withdrawing) of the seat belt 3 from the spool 5. It should be noted that the spool 5 and the motor 7 may be directly connected without the power transmission mechanism 9 disposed between the spool 5 and the motor 7, if required.

The power transmission mechanism 9 can be constructed as a so-called "single-stage clutch" (not shown). Accordingly, when the motor 7 is driven with a predetermined motor output in the power transmission operation mode of the power transmission mechanism 9, the rotation of the motor 7 is transmitted to the spool 5 with the rotational speed being reduced so that the spool 5 is driven to rotate with predetermined torque at predetermined rotational speed.

Alternatively, a power transmission mechanism capable of changing the rotational torque and the rotational speed of the spool into several stages may be employed. For example, in case of a two-stage clutch capable of changing the rotational torque and the rotational speed of the spool into two stages, the power transmission mechanism can be set in a high-reduction ratio mode with a relatively high rotational torque and a relatively low rotational speed in order to respond to a need for the winding of the seat belt onto the spool with a large belt tension. On the other hand, the power transmission mechanism can be set in a low-reduction ratio mode with a relatively low rotational torque and a relatively high rotational speed in order to respond to a need for the rapid winding of the seat belt onto the spool.

The seat belt retractor 1 of this embodiment can have the following seven seat belt control modes of the seat belt 3. Based on these seat belt control modes, the control of the motor 7 and the power transmission mechanism 9 are performed by the ECU 20.

(1) Belt Storage Mode

The belt storage mode is a control mode in which the seat belt 3 is not used and fully wound onto the spool 5. In the seat belt retractor 1 in the belt storage mode, the motor 7 is not driven and the power transmission mechanism 9 is set to the power transmission disconnection mode. Therefore, only a very weak belt tension is applied to the seat belt 3 and the power consumption is zero.

(2) Belt Withdrawing Mode

The belt withdrawing mode is a control mode in which the seat belt 3 is withdrawn from the spool 5 so as to be worn by the occupant. The seat belt retractor 1 in the belt withdrawing mode is also set in the power transmission disconnection mode. Therefore, the seat belt 3 can be withdrawn with a small force. Also in this case, the motor 7 is not driven so that the power consumption is zero.

(3) Belt Winding and Fitting Mode

The belt winding and fitting mode is a control mode in which, after the seat belt 3 is withdrawn and the tongue 12 is inserted into and latched with the seat belt buckle to turn ON the buckle switch 16a in FIG. 1, the excess part of the withdrawn seat belt 3 is wound up in order to fit the seat belt 3 to the occupant. In addition, the belt winding and fitting mode is a control mode in which, when the occupant moves so as to withdraw an amount of the seat belt 3 from the normally used state of the seat belt 3 (at this point, the buckle switch is in the ON state) and then the occupant returns to the original position, the withdrawn part of the seat belt 3 is wound up onto the spool. In the seat belt retractor 1 in the belt winding and fitting mode, the motor 7 is driven to rotate at a high rotational speed in the belt winding direction and the power transmission mechanism 9 is set to the power transmission operation mode. The seat belt 3 is rapidly wound onto the spool 5 and then the motor 7 is stopped when a very small predetermined belt tension is generated; thus the seat belt 3 is worn by and fitted to the occupant.

(4) Normal Wearing Mode

The normal wearing mode (or the comfortable mode) is a control mode in which the occupant wears the seat belt 3 in the normal state after the belt winding and fitting mode is terminated. In the seat belt retractor 1 in the normal wearing mode, the motor 7 is not driven and the power transmission mechanism 9 is set in the power transmission disconnection mode. Only a very weak belt tension is applied to the seat belt 3 so that the vehicle occupant can wear the seat belt 3 without any stress. In addition, the power consumption is zero.

(5) Warning Mode

The warning mode is a control mode in which, when the driver dozes or an obstacle around the subject vehicle is detected and the seat belt is in the normal wearing mode during running, the seat belt 3 is wound up repeatedly a predetermined number of times so as to warn the driver. In the seat belt retractor 1 in the warning mode, the motor 7 is controlled to be driven repeatedly. The operation of alternately applying a relatively strong belt tension (but which is still weaker than the belt tension during the emergency mode, as will be described later) and a very weak belt tension onto the seat belt 3 is repeated; thus drawing the driver's attention to the fact that the driver is dozing or there is an obstacle around the vehicle.

(6) Emergency Mode

The emergency mode is a control mode, which is set when the vehicle is extremely likely to have a collision with an obstacle or the like during the normal wearing mode or following the aforementioned warning mode. In the seat belt retractor 1 in the emergency mode, the power transmission mechanism 9 is set in the power transmission operation mode and the motor 7 is controlled to rotate at a high rotational speed with a high rotational torque in the belt winding direction. The motor 7 is stopped when a predetermined extremely strong belt tension is generated on the seat belt 3 after the seat belt 3 is rapidly wound onto the spool 5, thereby securely restraining the vehicle occupant with the seat belt 3.

(7) Belt Winding and Storing Mode

The belt winding and storing mode is a control mode in which the seat belt 3 is fully wound to be in the storage state. In the seat belt retractor 1 in the belt winding and storing mode, the power transmission mechanism 9 is set to the power transmission operation mode and the motor 7 is controlled to rotate in the belt winding direction. Accordingly, the withdrawn seat belt 3 is promptly wound onto the spool 5. The motor 7 is stopped when the seat belt 3 is fully wound and a predetermined belt tension that is very weak is developed. Thus, the seat belt 3 comes into the belt storage mode in which the aforementioned very weak belt tension is applied to the seat belt 3.

Figure 4:
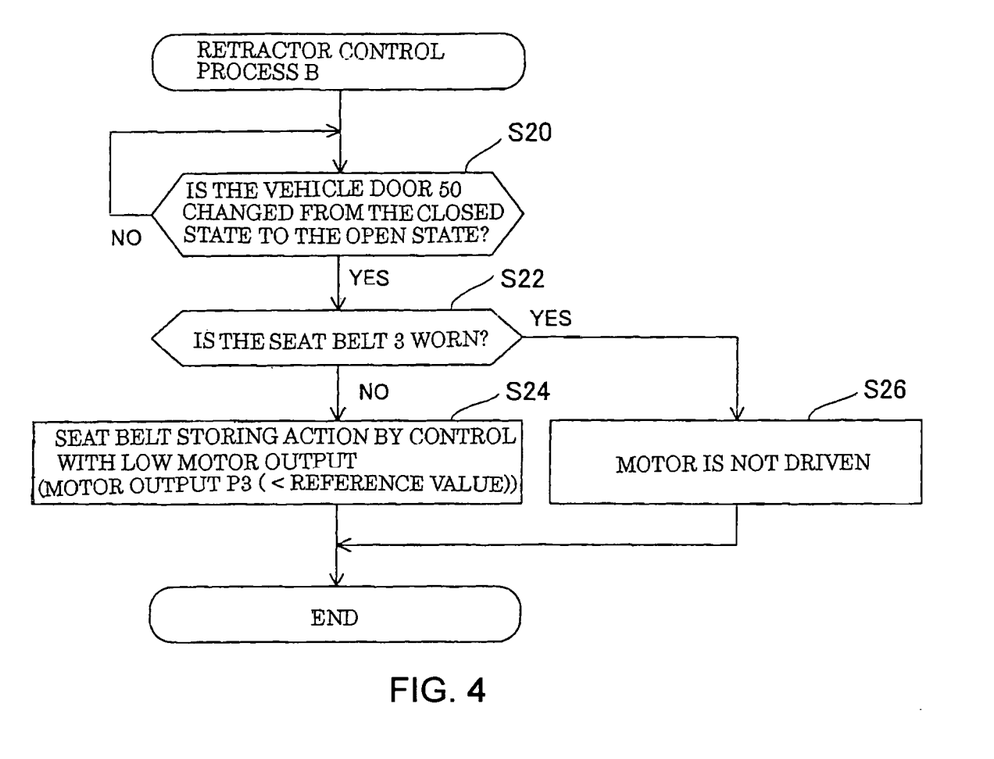
FIG. 4 shows a flow chart showing the retractor control process B according to an embodiment of the present invention.
Figure 5:
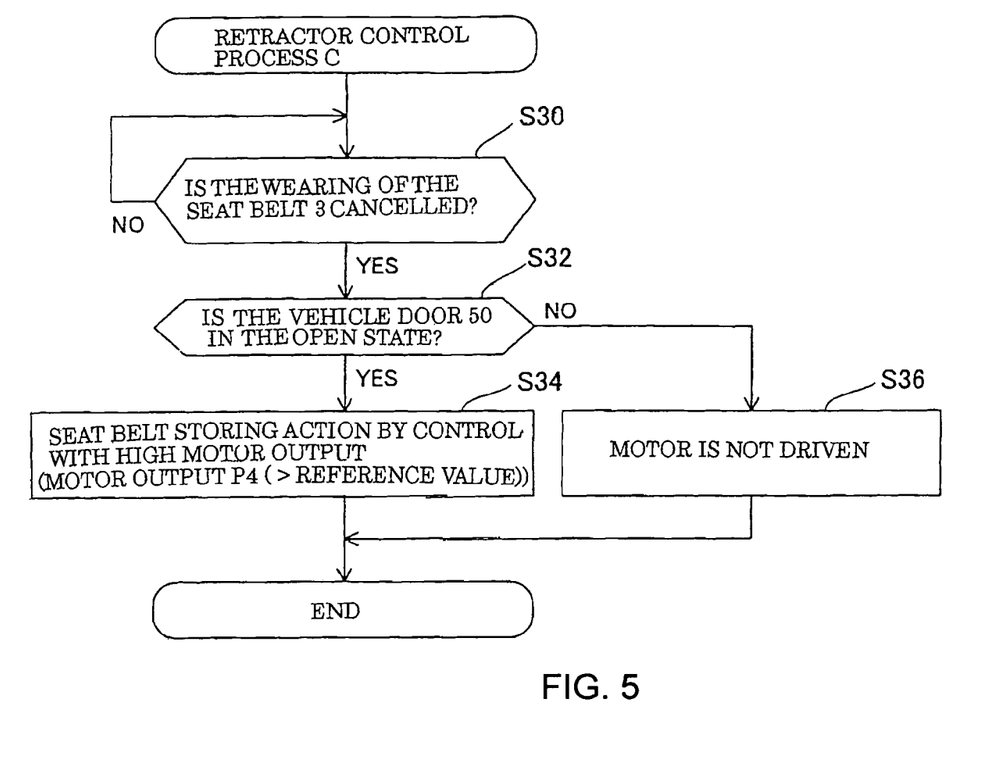
FIG. 5 shows a flow chart showing the retractor control process C according to an embodiment of the present invention.

With regard to the belt winding and storing mode, the behavior of the vehicle door 50 as an object which catches the seat belt 3 or the tongue 12 is reflected at least in the control of the seat belt winding action so as to achieve a sophisticated control. According to this embodiment, the control in the belt winding and storing mode is based on the premise that the original purpose of the seat belt winding action (the seat belt storing control) is to prevent the seat belt 3 (which is kept in the unwound state) or the tongue 12 from being caught by the vehicle door 50. This control is conducted according to, for example, the "retractor control process (or the seat belt storing control process)" as shown in FIG. 3 through FIG. 5 by the controller (for example, the ECU 20 in FIG. 1 and FIG. 2).

(Retractor Control Process A)

Figure 3:
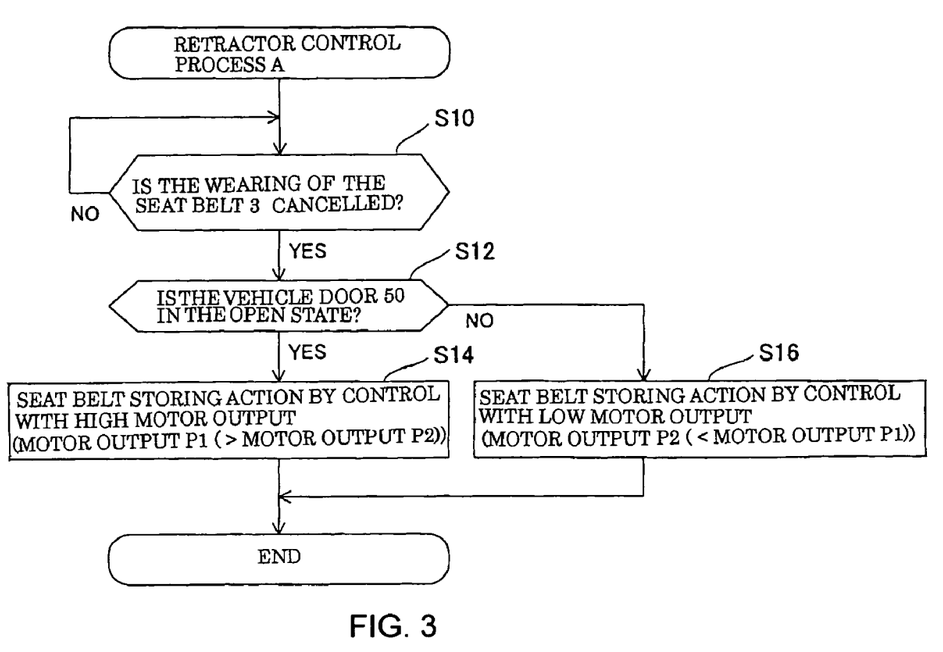
FIG. 3 shows a flow chart showing the retractor control process A according to an embodiment of the present invention.

FIG. 3 shows a flow chart of the retractor control process A according to an embodiment of the present invention.

In the retractor control process A shown in FIG. 3, in the step S10, it is determined whether or not the seat belt (for example, the seat belt 3 in FIG. 1) is changed from the worn state to the released state. For example, based on the information detected by the buckle switch 16a for detecting the insertion and latching of the tongue 12 to the seat belt buckle 16, it is determined that the seat belt 3 is changed from the worn state to the released state when the buckle switch 16a is changed from the ON state to the OFF state. This determination can be achieved by the ECU 20, which detects the information from the buckle switch 16a. In the step S10, the process continues until the seat belt 3 is changed from the worn state to the released state and proceeds to the step S12 when it is determined that the seat belt 3 is changed from the worn state to the released state (the YES path in the step S10).

In step S12, it is determined whether or not the vehicle door (for example, the vehicle door 50 shown in FIG. 1) is in the open state. Based on the information detected by the vehicle door sensor 52 shown in FIG. 1, it is determined that the vehicle door 50 is in the open state when the vehicle door sensor is ON. This determination can be achieved by the ECU 20, which can detect the information from the vehicle door sensor 52. From the step 12, the process proceeds to the step S14 when it is determined that the vehicle door 50 is in the open state (the YES path in the step S12) and proceeds to the step S16 if not, i.e. when it is determined that the vehicle door 50 is in the closed state (the NO path in the step S12).

In the step S14, the seat belt winding control (the seat belt storing control) with the motor 7 in the high power output control (the motor output P1) is conducted. In step S16, the seat belt winding control (the seat belt storing control) with the motor 7 in the low power output control (the motor output P2<P1) is conducted.

In cases where the vehicle door 50 is already in the open state when the wearing of the seat belt is cancelled, there must be only a very short time until the vehicle door 50 is closed. In this case, the control in which the motor output of the motor 7 is set to the motor output P1 is conducted in the step S14 in order to rapidly wind up the seat belt 3. Conversely, in cases where the vehicle door 50 is in the closed state when the wearing of the seat belt is cancelled, there must be a relatively long time until the vehicle door 50 is closed again once it is opened. In this case, the control in which the motor output of the motor 7 is set to the motor output P2 is conducted in step S16 in order to gently wind up the seat belt 3 for the vehicle occupant C. That is, the control in the step S14 and the control in the step S16 are different from each other in the motor output of the motor 7.

In the control during the step S14 and the step S16, the power transmission mechanism 9 of the seat belt retractor 1 is set in the power transmission operation mode and the motor 7 is driven to rotate in the belt winding direction. Since the motor output of the motor 7 is the product of a current value (sometimes referred to as a "control current value") and a voltage value (sometimes referred to as an "applied voltage value"), the motor output can be changed by suitably changing the current value and/or the voltage value.

With regard to the retractor control processes A-C, the seat belt winding action in the belt winding and storing mode may be conducted only by the driving force of the motor 7 or by the winding force of an elastic member, such as a return spring which acts on the spool 5, with the driving force of the motor 7 as a secondary force.

According to the retractor control process A, a sophisticated (detailed) control for the seat belt winding action is achieved by changing the motor output of the motor 7 according to the state of the vehicle door 50 when the wearing of the seat belt 3 is cancelled (a satisfaction pattern of starting condition) in the seat belt storing control. The retractor control process A can corresponds to a "control mode."

(Retractor Control Process B)

FIG. 4 shows a flow chart of the retractor control process B according to an embodiment of the present invention.

In the retractor control process B shown in FIG. 4, in step S20, it is determined whether or not the vehicle door (for example, the vehicle door 50 in FIG. 1) is changed from the closed state to the open state. Based on the information detected by the vehicle door sensor 52 shown in FIG. 1, it can be determined that the vehicle door 50 is changed from the closed state to the open state when the vehicle door sensor 52 is changed from the OFF state to the ON state. This determination can be achieved by the ECU 20 which detects the detected information from the vehicle door sensor 52. In the step S20, the process continues until the vehicle door 50 is changed from the closed state to the open state and proceeds to the step S22 when it is determined that the vehicle door 50 is changed from the closed state to the open state (the YES path in step S20).

In the step S22, it is determined whether or not the seat belt (for example, the seat belt 3 in FIG. 1) is changed from the worn state to the released state.

Based on the information detected by the buckle switch 16a for detecting the insertion and latching of the tongue 12 to the seat belt buckle 16 shown in FIG. 1, it can be determined that the seat belt 3 is in the worn state when the buckle switch 16a is in the ON state. This determination can be achieved by the ECU 20 which detects the information from the buckle switch 16a. Also, in the step S22, the process proceeds to step S24 when it is determined that the seat belt 3 is in the released state (the NO path in the step S22) and proceeds to the step S26 when it is determined that the seat belt 3 is in the worn state (the YES path in the step S22).

In the step S24, the seat belt winding control (the seat belt storing control) with the motor 7 in the low power output control (the motor output P3) is conducted. In the step S26, the seat belt winding control (the seat belt storing control) by the motor 7 is not conducted, i.e., the motor output is zero. It should be noted that, even in the step S26, the motor output of the motor 7 may be set to such a degree that the spool 5 is not rotated.

In cases where the wearing of the seat belt 3 is cancelled just after the vehicle door 50 is opened, it is more likely that the vehicle door 50 will not be closed for a while. In this case, the control in which the motor output of the motor 7 is set to the motor output P3 is conducted in the step S24 in order to gently wind up the seat belt 3 for the vehicle occupant C. The motor output P3 can be suitably set to any degree within a range under a preset reference value. On the other hand, in cases where the seat belt 3 is in the worn state, the seat belt winding action is not required in the step S26. That is, the control in step S24 and the control in step S26 are different from each other in the motor output of the motor 7.

In the control in the step S24, the power transmission mechanism 9 of the seat belt retractor 1 is set in the power transmission operation mode and the motor 7 is driven with the motor output P3 to rotate in the belt winding direction. In the control in the step S26, the power transmission mechanism 9 of the seat belt retractor 1 is set in the power transmission operation mode and the motor output of the motor 7 is set to zero or the power transmission mechanism 9 of the seat belt retractor 1 is set to the power transmission disconnection mode.

According to the retractor control process B, a sophisticated (detailed) control for the seat belt winding action is achieved by changing the motor output of the motor 7 according to the state of the seat belt 3 when the vehicle door 50 is changed from the closed state to the open state (a satisfaction pattern of the starting condition) in the seat belt storing control.

The retractor control process B can correspond to a "control mode."

(Retractor Control Process C)

FIG. 5 shows a flow chart of the retractor control process C according to an embodiment of the present invention.

In the retractor control process C shown in FIG. 5, the step S30 and the step 32 are similar to the step S10 and the step S12 of the retractor control A.

When it is determined that the vehicle door 50 is in the open state in step S32 (the YES path in the step S32), the process proceeds to the step S34. If not, i.e. when it is determined that the vehicle door 50 is in the closed state (the NO path in step S32), the process proceeds to step S36.

In the step S34, the seat belt winding control (the seat belt storing control) with the motor 7 in the high power output control (the motor output P4) is conducted. In the step S36, the seat belt winding control (the seat belt storing control) by the motor 7 is not conducted, i.e., the motor output is zero. It should be noted that, even in the step S36, the motor output of the motor 7 may be set to such a degree that the spool 5 is not rotated.

In cases where the vehicle door 50 is already in the open state when the wearing of the seat belt 3 is cancelled, there must be only a very short time until the vehicle door 50 is closed. In this case, the control in which the motor output of the motor 7 is set to the high motor output P4 is conducted in the step S34 in order to rapidly wind up the seat belt 3. The motor output P4 can be suitably set to any degree within a range over a preset reference value. Conversely, in cases where the vehicle door 50 is in the closed state when the wearing of the seat belt is cancelled, there must be a relatively long time until the vehicle door 50 is closed once it is opened so that the seat belt winding action is not required in the step S36. That is, the control in step S34 and the control in step S36 are different from each other in the motor output of the motor 7.

In the control in the step S34, the power transmission mechanism 9 of the seat belt retractor 1 is set in the power transmission operation mode and the motor 7 is driven with the motor output P4 to rotate in the belt winding direction. In the control in step S36, the power transmission mechanism 9 of the seat belt retractor 1 is set in the power transmission operation mode and the motor output of the motor 7 is set to zero or the power transmission mechanism 9 of the seat belt retractor 1 is set to the power transmission disconnection mode.

According to the retractor control process C, a sophisticated (detailed) control for the seat belt winding action can be achieved by changing the motor output of the motor 7 according to the state of the vehicle door 50 when the wearing of the seat belt 3 is cancelled (a satisfaction pattern of the starting condition) in the seat belt storing control. The retractor control process C can correspond to a "control mode."

Therefore, various embodiments can provide a seat belt retractor 1, a seat belt apparatus 100, and a vehicle with the seat belt apparatus 100 in which control for the seat belt winding action is achieved.

In one embodiment of the present invention, the retractor control processes A through C may be employed independently. Alternatively, a first combination of the retractor control process A and the retractor control process B or a second combination of the retractor control process B and the retractor control process C may be employed. In the first combination, the motor output P2 in the step SI 6 and the motor output P3 in the step S24 are set to be equal to each other.

In this embodiment, when the starting condition (which is defined by the state of the seat belt 3 relative to the vehicle occupant C and the state of the vehicle door 50 corresponding to the seat belt 3) is satisfied, the motor 7 is controlled to rotate in the seat belt winding direction such that the motor output of the motor 7 is varied according to the satisfaction pattern of the starting condition. That is, the start of winding of the seat belt 3 depends on the combination of the state of the seat belt 3 (the worn state or the released state) and the state of the vehicle door 50 (the open state or the closed state) and the motor output of the motor 7 is varied according to the satisfaction pattern of the starting condition. Satisfaction patterns of the starting condition may be suitably set according to the combination of the state of the seat belt 3 and the state of the vehicle door 50 and the satisfying order. The number of the satisfaction patterns can be set according to need.

The present invention is not limited to the aforementioned embodiments but various variations and modifications may be made. For example, the following embodiment as a variation of the aforementioned embodiments may be carried out.

Although an embodiment has been described with regard to the seat belt retractor 1 being installed in an automobile, the seat belt retractor can be adopted to seat belt apparatuses to be installed in a vehicle for the transfer of one or more occupants, such as an automobile, an aircraft, a boat, a train, and a bus.

The priority application, Japan Priority Application 2005-188473, filed Jun. 28, 2005 including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt retractor to be installed in a vehicle comprising:
    an electric motor;
    a spool capable of winding a seat belt for occupant restraint in association with a driving of the electric motor; and
    a controller for controlling the electric motor,
    wherein a starting condition is defined by a state of the seat belt relative to a vehicle occupant and a state of a vehicle door corresponding to the seat belt,
    wherein, in cases where the starting condition is satisfied, the controller is configured to control rotation of the spool in a belt winding direction such that rotation of the spool is varied according to a satisfaction pattern of the starting condition, and
    wherein the satisfaction pattern comprises the state of the vehicle door being changed from a closed state to an open state and the state of the seat belt after the state of the vehicle door has changed from the closed state to the open state.

2. A seat belt retractor as claimed in claim 1, wherein, when the satisfaction pattern of the starting condition comprises the seat belt being changed from a worn state to a released state after the state of the vehicle door corresponding to the seat belt has changed from the closed state to the open state, the controller is configured to control the electric motor to rotate the spool in the belt winding direction.

3. A seat belt retractor as claimed in claim 1, wherein, when the satisfaction pattern of the starting condition comprises the seat belt remaining in a worn state after the state of the vehicle door corresponding to the seat belt has changed from the closed state to the open state, the controller is configured to control the electric motor such that the spool does not to rotate.

4. A seat belt retractor as claimed in claim 1, wherein, in cases where the starting condition is satisfied, the controller is configured to control the electric motor such that the electric motor is operated according to only a single determination of the state of the seat belt immediately after the state of the vehicle door has changed from the closed state to the open state.

5. A seat belt apparatus to be installed in a vehicle comprising:
   a seat belt for occupant restraint adapted to be worn by a vehicle occupant;
   an electric motor;
   a spool capable of winding the seat belt in association with a driving of the electric motor;
   a controller for controlling the electric motor;
   a seat belt buckle adapted to be fixed to the vehicle;
   a tongue attached to the seat belt and is latched to the seat belt buckle when the seat belt is worn; and
   a detection sensor for detecting that the tongue is latched to the seat belt buckle, wherein a starting condition is defined by a state of the seat belt relative to the vehicle occupant and a state of a vehicle door corresponding to the seat belt,
   wherein in cases where the starting condition is satisfied, the controller is configured to determine whether or not the seat belt is worn by the vehicle occupant based on information detected by the detection sensor,
   wherein the controller is configured to control rotation of the spool in a belt winding direction such that the rotation of the spool is varied according to a satisfaction pattern of the starting condition, and
   wherein the satisfaction pattern of the starting condition comprises the state of the vehicle door being changed from a closed state to an open state and the state of the seat belt after the state of the vehicle door has changed from the closed state to the open state.

6. A seat belt apparatus as claimed in claim 5, wherein, when the satisfaction pattern of the starting condition comprises the determination that the seat belt is not worn based on information detected by the detection sensor after the state of the vehicle door corresponding to the seat belt has changed from the closed state to the open state, the controller is configured to control the electric motor to rotate the spool in the belt winding direction.

7. A seat belt apparatus as claimed in claim 5, wherein, when the satisfaction pattern of the starting condition comprises the determination that the seat belt is worn based on information detected by the detection sensor after the state of the vehicle door corresponding to the seat belt has changed from the closed state to the open state, the controller is configured to control the electric motor such that the spool does not to rotate.

8. A seat belt apparatus as claimed in claim 5, further comprising a contact sensor for determining the state of the vehicle door corresponding to the seat belt.

9. A seat belt apparatus as claimed in claim 8, wherein the contact sensor comprises a first contact adapted to be placed on the vehicle door and a second contact adapted to be placed on a vehicle pillar.

10. A seat belt apparatus as claimed in claim 5, further comprising a transmission mechanism disposed between the spool and the electric motor, wherein the transmission mechanism is configured to selectively achieve a connected state where the electric motor and the spool are connected and a disconnected state where the connected state is cancelled.

11. A seat belt apparatus as claimed in claim 10, wherein, when the satisfaction pattern of the starting condition comprises the state of the seat belt being worn after the state of the vehicle door corresponding to the seat belt has changed from the closed state to the open state, the controller is configured to have the transmission mechanism in the disconnected state.

12. A seat belt apparatus as claimed in claim 5, wherein, in cases where the starting condition is satisfied, the controller is configured to control the electric motor such that the electric motor is operated according to only a single determination of the state of the seat belt immediately after the state of the vehicle door has changed from the closed state to the open state.

13. A vehicle with a seat belt apparatus comprising:
   a seat belt apparatus comprising a seat belt retractor, wherein the seat belt retractor comprises:
   an electric motor;
   a spool capable of winding a seat belt for occupant restraint in association with a driving of the electric motor; and
   a controller for controlling the electric motor,
   wherein a starting condition is defined by a state of the seat belt relative to a vehicle occupant and a state of a vehicle door corresponding to the seat belt,
   wherein in cases where the starting condition is satisfied, the controller is configured to control rotation of the spool in a belt winding direction such that the rotation of the spool is varied according to a satisfaction pattern of the starting condition,
   wherein the seat belt apparatus is accommodated in an accommodating space in the vehicle, and
   wherein the satisfaction pattern of the starting condition is defined the state of the vehicle door being changed from a closed state to an open state and the state of the seat belt after the state of the vehicle door has changed from the closed state to the open state.

14. A vehicle as claimed in claim 13, wherein, in cases where the starting condition is satisfied, the controller is configured to control the electric motor such that the electric motor is operated according to only a single determination of the state of the seat belt immediately after the state of the vehicle door has changed from the closed state to the open state.

* * * * *